United States Patent
Alli et al.

(10) Patent No.: US 9,372,837 B2
(45) Date of Patent: Jun. 21, 2016

(54) SINGLE VIEW REPRESENTATION OF AN XLS TRANSFORMATION

(71) Applicant: Oracle International Corporation, Redwood Shores, CA (US)

(72) Inventors: Sunitha Alli, Centennial, CO (US); Thomas Hora, Parker, CO (US); Agnes Freese, Niwot, CO (US)

(73) Assignee: ORACLE INTERNATIONAL CORPORATION, Redwood Shores, CA (US)

(*) Notice: Subject to any disclaimer, the term of this patent is extended or adjusted under 35 U.S.C. 154(b) by 630 days.

(21) Appl. No.: 13/693,942

(22) Filed: Dec. 4, 2012

(65) Prior Publication Data

US 2013/0097487 A1    Apr. 18, 2013

Related U.S. Application Data

(63) Continuation-in-part of application No. 13/368,300, filed on Feb. 7, 2012.

(60) Provisional application No. 61/540,187, filed on Sep. 28, 2011.

(51) Int. Cl.
G06F 17/22 (2006.01)

(52) U.S. Cl.
CPC .......... *G06F 17/2247* (2013.01); *G06F 17/227* (2013.01)

(58) Field of Classification Search
CPC .............. G06F 17/227; G06F 17/2247; G06F 17/2258; G06F 17/2264
See application file for complete search history.

(56) References Cited

U.S. PATENT DOCUMENTS

| 6,823,495 | B1* | 11/2004 | Vedula et al. ................. 715/805 |
| 7,096,422 | B2* | 8/2006 | Rothschiller ....... G06F 17/2247 707/E17.125 |
| 7,237,207 | B2* | 6/2007 | Panditharadhya et al. .................... G06F 17/227 715/763 |
| 7,636,894 | B2* | 12/2009 | Vedula et al. ................. 715/763 |
| 7,676,756 | B2* | 3/2010 | Vedula et al. ................. 715/763 |
| 8,280,923 | B2* | 10/2012 | Robertson et al. ............ 707/805 |
| 2003/0237046 | A1* | 12/2003 | Parker et al. .................. 715/513 |
| 2004/0172616 | A1* | 9/2004 | Rothschiller ....... G06F 17/2247 717/114 |

(Continued)

OTHER PUBLICATIONS

Non-Final office action mailed Dec. 15, 2015 for U.S. Appl. No. 13/368,300, all pages.
Ducharme, "Generating Unique IDs and Linking to Them," 2001 accessed on Sep. 15, 2015 at: http://www.xml.com/pub/a/2001/10/03/unique-ids.html.

(Continued)

*Primary Examiner* — Cesar Paula
*Assistant Examiner* — Tyler J Schallhorn
(74) *Attorney, Agent, or Firm* — Kilpatrick Townsend & Stockton LLP

(57) ABSTRACT

In various embodiments, arrangements for presenting an XSLT mapping tool is presented. A computer system may receive XML source code that includes a plurality of source nodes. The computer system may also receive XSLT code configured to transform the XML source code into XML target code. The XSLT code may include multiple templates. The computer system may use the multiple templates of the XSLT code and the XML source code to create XML target code. The XML target code may include a plurality of target nodes. An interface of the XSLT mapping tool that displays mappings between the plurality of source nodes of the XML source code and the plurality of target nodes of the XML target code resulting from the multiple XSLT templates may be presented.

18 Claims, 8 Drawing Sheets

(56) References Cited

U.S. PATENT DOCUMENTS

| | | | |
|---|---|---|---|
| 2005/0015732 A1* | 1/2005 | Vedula et al. | 715/805 |
| 2005/0021513 A1* | 1/2005 | Vedula et al. | 707/3 |
| 2005/0132282 A1* | 6/2005 | Panditharadhya et al. | 715/516 |
| 2005/0257193 A1* | 11/2005 | Falk et al. | 717/109 |
| 2009/0125512 A1* | 5/2009 | Robertson et al. | 707/5 |
| 2013/0080876 A1 | 3/2013 | Freese | |
| 2014/0149961 A1* | 5/2014 | Falk et al. | 717/105 |

OTHER PUBLICATIONS

Villard et al., "An Incremental XSLT Transformation Process for XML Document Manipulation," 2002 accessed on Sep. 15, 2015 at: http://www.research.ibm.com/people/v/villard/Papiers/incxsIt/incXSLT.html.

Non-Final office action mailed Nov. 20, 2014 for U.S. Appl. No. 13/368,300, 58 pages.

Final office action mailed Jun. 25, 2015 for U.S. Appl. No. 13/368,300, 30 pages.

\* cited by examiner

400A

```
<?xml version="1.0" encoding="windows-1252" ?>
<xsl:stylesheet version="2.0" xmlns:xsl="http://www.w3.org/1999/XSL/Transform">
  <xsl:template match="option">
    <BeginTemplate>
      <TemplateID>1</TemplateID>
      <BeginApplyTemplate>
        <ApplyTemplateID>1_1</ApplyTemplateID>
        <xsl:apply-templates/>
      </BeginApplyTemplate>
    </BeginTemplate>
  </xsl:template>
  <xsl:template match="name">
    <BeginTemplate>
      <TemplateID>2</TemplateID>
    </BeginTemplate>
  </xsl:template>
  <xsl:template match="stock">
    <BeginTemplate>
      <TemplateID>3</TemplateID>
    </BeginTemplate>
  </xsl:template>
  <xsl:template match="details">
    <BeginTemplate>
      <TemplateID>4</TemplateID>
      <BeginApplyTemplate>
        <ApplyTemplateID>4_1</ApplyTemplateID>
        <xsl:apply-templates/>
      </BeginApplyTemplate>
    </BeginTemplate>
  </xsl:template>
  <xsl:template match="/">
    <TemplateStructure>
      <BeginTemplate>
        <TemplateID>5</TemplateID>
        <BeginApplyTemplate>
          <ApplyTemplateID>5_1</ApplyTemplateID>
          <xsl:apply-templates/>
        </BeginApplyTemplate>
      </BeginTemplate>
    </TemplateStructure>
  </xsl:template>
</xsl:stylesheet>
```
XSL

```
<?xml version = '1.0' encoding = 'UTF-8'?>
<TemplateStructure>
 <BeginTemplate>
  <TemplateID>5</TemplateID>
  <BeginApplyTemplate>
   <ApplyTemplateID>5_1</ApplyTemplateID>
   <BeginTemplate>
    <TemplateID>4</TemplateID>
    <BeginApplyTemplate>
     <ApplyTemplateID>4_1</ApplyTemplateID>
     <BeginTemplate>
      <TemplateID>2</TemplateID>
     </BeginTemplate>
     <BeginTemplate>
      <TemplateID>3</TemplateID>
     </BeginTemplate>
     <BeginTemplate>
      <TemplateID>1</TemplateID>
      <BeginApplyTemplate>
       <ApplyTemplateID>1_1</ApplyTemplateID>
       <BeginTemplate>
        <TemplateID>2</TemplateID>
       </BeginTemplate>
       <BeginTemplate>
        <TemplateID>3</TemplateID>
       </BeginTemplate>
      </BeginApplyTemplate>
     </BeginTemplate>
    </BeginApplyTemplate>
   </BeginTemplate>
  </BeginApplyTemplate>
 </BeginTemplate>
</TemplateStructure>
```

XML Output Code

FIG. 4B

SINGLE VIEW REPRESENTATION OF AN XLS TRANSFORMATION

CROSS REFERENCES

This application is a continuation-in-part of application Ser. No. 13/368,300, filed Feb. 7, 2012, entitled "Using Template Processors to Determine Context Nodes," which is a nonprovisional of, and claims benefit to Provisional Application No. 61/540,187, filed Sep. 28, 2011, entitled "USING XSLT PROCESSOR TO DETERMINE CONTEXT NODES FOR DESIGN-TIME DISPLAY," the entire disclosure of which is hereby incorporated by reference for all purposes.

BACKGROUND OF THE INVENTION

In some software applications, instances of a particular data type may be processed, formatted, and/or displayed according to one or more style sheets. A style sheet may by written in a number of different formats and programming languages, and may include templates that include instructions for operations performed on one or more of the instances of the data types according to matching criteria. For instance, a file may contain data while the style sheet details how such data is to be presented to a user.

For example, XML files may contain elements and sub-elements that may be considered data types and/or data instances. An XSLT file is a type of style sheet that contains templates used by an XSLT processor to process the XML data types and instances. Accordingly, the templates present in the XSLT file may define how elements and sub-elements of the XML files are structured and/or presented to a user.

SUMMARY OF THE INVENTION

In some embodiments, a method for providing an XSLT mapping tool is presented. The method may include receiving, by a computer system, XML source code that includes a plurality of source nodes. The method may include receiving, by the computer system, XSLT code configured to transform the XML source code into XML target code. The XSLT code may include multiple XSLT templates. The method may include using, by the computer system, the multiple XSLT templates of the XSLT code and the XML source code to create the XML target code. The XML target code may include a plurality of target nodes. The method may include presenting, by the computer system, an interface of the XSLT mapping tool that displays mappings between the plurality of source nodes of the XML source code and the plurality of target nodes of the XML target code resulting from the multiple XSLT templates.

Embodiments of such a method may include one or more of the following: Presenting the interface of the XSLT mapping tool that directly displays the mappings between the plurality of source nodes of the XML source code and the plurality of target nodes of the XML target code may include hiding code of the multiple XSLT templates. The method may include receiving, by the computer system, a selection of a target node from the plurality of target nodes from a user. The method may include presenting, by the computer system, a graphical indication of a source node of the plurality of source nodes mapped to the target node. The method may include presenting, by the computer system, at the same time as the graphical indication of the source node, code of an XSLT template of the multiple XSLT templates that maps the source node to the target node. The method may include concurrently with presenting the interface of the XSLT mapping tool that directly displays the mappings between the plurality of source nodes of the XML source code and the plurality of target nodes of the XML target code, displaying: a source structure of the plurality of source nodes of the XML source code; and a target structure of the plurality of target nodes of the XML target code. The method may include modifying, by the computer system, the XSLT code to include an identifier for each XSLT template of the multiple XSLT templates of the XSLT code, wherein each identifier varies from each other identifier included in the XSLT code. The method may include executing, by the computer system, the modified XSLT code.

Additionally or alternatively, embodiments of such a method may include one or more of the following: The method may include creating, by the computer system, XML output code that, based on each identifier for each XSLT template, indicates a call structure of the XSLT code. The method may include determining, by the computer system, a structure of the XML target code using the call structure of the XSLT code. Presenting the interface of the XSLT mapping tool that directly displays the mappings between the plurality of source nodes of the XML source code and the plurality of target nodes of the XML target code may include presenting the determined structure of the XML target code. The interface of the XSLT mapping tool may be presented using a web-based graphical user interface and the computer system is remote from a user submitting the XSLT code and the XML source code.

In some embodiments, a computer program product residing on a non-transitory processor-readable medium for providing an XSLT mapping tool may be presented. The computer program product may include processor-readable instructions configured to cause a processor to receive XML source code that includes a plurality of source nodes. The computer program product may include processor-readable instructions configured to cause the processor to receive XSLT code configured to transform the XML source code into XML target code. The XSLT code may include multiple XSLT templates. The computer program product may include processor-readable instructions configured to cause the processor to use the multiple XSLT templates of the XSLT code and the XML source code to create the XML target code. The XML target code may include a plurality of target nodes. The computer program product may include processor-readable instructions configured to cause the processor to cause an interface of the XSLT mapping tool to be presented that displays mappings between the plurality of source nodes of the XML source code and the plurality of target nodes of the XML target code resulting from the multiple XSLT templates.

Embodiments of such a computer program product may include one or more of the following: The processor-readable instructions that cause the interface of the XSLT mapping tool to be presented that directly displays the mappings between the plurality of source nodes of the XML source code and the plurality of target nodes of the XML target code may further include processor-readable instructions configured to cause code of the multiple XSLT templates to not be presented. The processor-readable instructions further comprise processor-readable instructions configured to cause the processor to receive a selection of a target node from the plurality of target nodes from a user. The computer program product may include processor-readable instructions configured to cause the processor to cause a graphical indication of a source node of the plurality of source nodes mapped to the target node to be presented. The computer program product may include processor-readable instructions configured to cause the processor to cause, at the same time as the graphical indication of the source node, code of an XSLT template of the multiple XSLT templates that maps the source node to the target node to be presented.

Additionally or alternatively, embodiments of such a computer program product may include one or more of the following: The computer program product may include processor-readable instructions configured to cause the processor to concurrently with causing the interface of the XSLT mapping tool that directly displays the mappings between the plurality of source nodes of the XML source code and the plurality of target nodes of the XML target code to be presented, cause: a source structure of the plurality of source nodes of the XML source code to be presented; and a target structure of the plurality of target nodes of the XML target code to be presented. The computer program product may include processor-readable instructions configured to cause the processor to modify the XSLT code to include an identifier for each XSLT template of the multiple XSLT templates of the XSLT code. Each identifier may vary from each other identifier included in the XSLT code. The computer program product may include processor-readable instructions configured to cause the processor to execute the modified XSLT code. The computer program product may include processor-readable instructions configured to cause the processor to create XML output code that, based on each identifier for each XSLT template, indicates a call structure of the XSLT code. The computer program product may include processor-readable instructions configured to cause the processor to determine a structure of the XML target code using the call structure of the XSLT code. The processor-readable instructions for causing the interface of the XSLT mapping tool that directly displays the mappings between the plurality of source nodes of the XML source code and the plurality of target nodes of the XML target code to be presented may further include processor-readable instructions configured to cause the determined structure of the XML target code to be presented. The interface of the XSLT mapping tool may be presented using a web-based graphical user interface and the processor is remote from a user submitting the XSLT code and the XML source code.

In some embodiments, a system for providing an XSLT mapping tool is presented. The system may include a processor. The system may include a memory communicatively coupled with and readable by the processor and having stored therein processor-readable instructions. When executed by the processor, the processor-readable instructions may cause the processor to receive XML source code that includes a plurality of source nodes. When executed by the processor, the processor-readable instructions may cause the processor to receive XSLT code configured to transform the XML source code into XML target code. The XSLT code may include multiple XSLT templates. When executed by the processor, the processor-readable instructions may cause the processor to use the multiple XSLT templates of the XSLT code and the XML source code to create the XML target code. The XML target code may include a plurality of target nodes. When executed by the processor, the processor-readable instructions may cause the processor to cause an interface of the XSLT mapping tool to be presented that displays mappings between the plurality of source nodes of the XML source code and the plurality of target nodes of the XML target code resulting from the multiple XSLT templates. The processor-readable instructions may be further configured to cause code of the multiple XSLT templates to not be displayed.

BRIEF DESCRIPTION OF THE DRAWINGS

A further understanding of the nature and advantages of various embodiments may be realized by reference to the following figures. In the appended figures, similar components or features may have the same reference label. Further, various components of the same type may be distinguished by following the reference label by a dash and a second label that distinguishes among the similar components. If only the first reference label is used in the specification, the description is applicable to any one of the similar components having the same first reference label irrespective of the second reference label.

FIG. 4A illustrates an embodiment of XSLT code modified to contain template identifiers.

FIG. 4B illustrates an embodiment of XML output code generated based on the modified XSLT code that contains template identifiers.

DETAILED DESCRIPTION OF THE INVENTION

Figure 1:
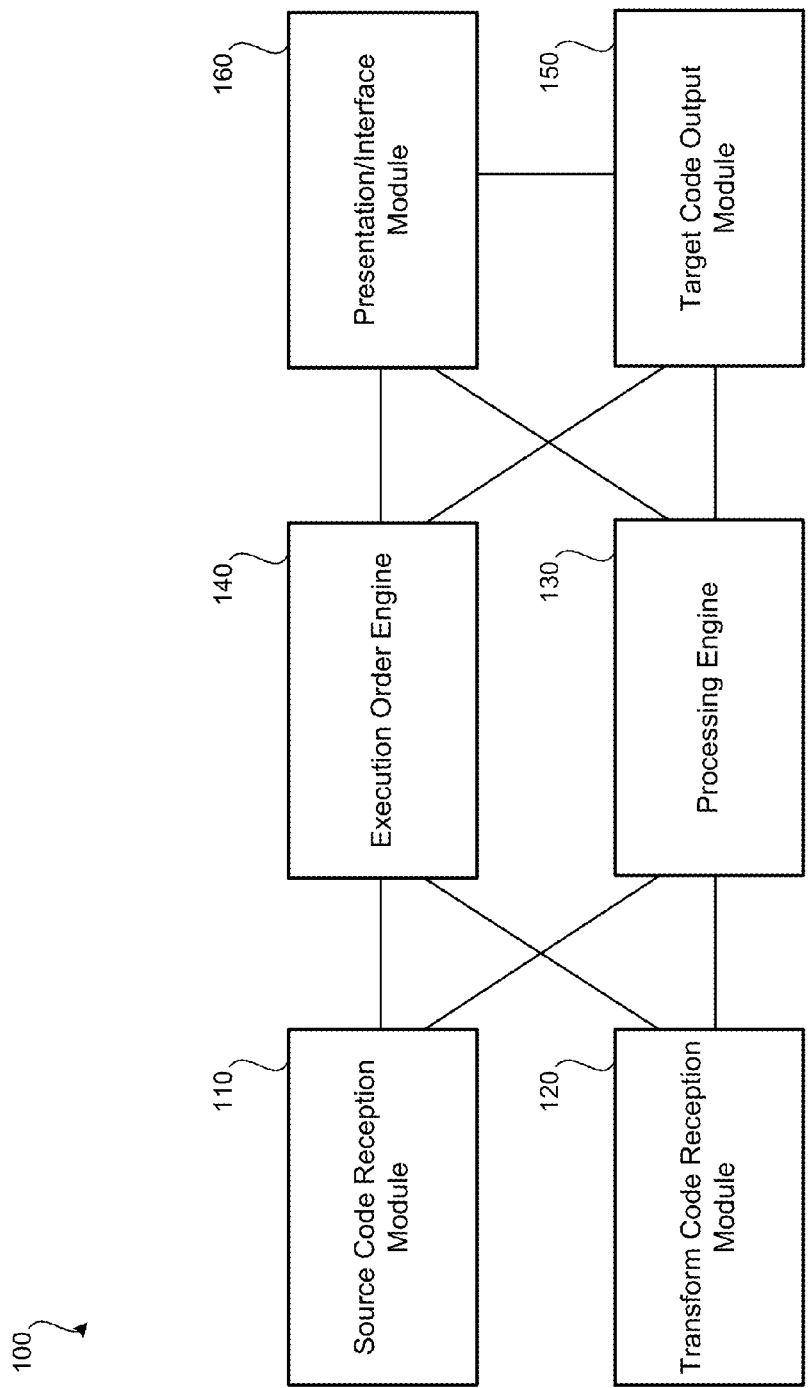
FIG. 1 illustrates an embodiment of a system configured to present an XSLT mapping tool.

Extensible Stylesheet Language Transformations (XSLT) is an extensible Markup Language (XML) based language that can be used to transform XML documents. An XML document may contains various nodes. Within an XML document, each element may be considered a node. An XSLT document may be applied to an XML document to modify the structure and/or apply formatting to elements of the XML document. As a simple example, an XSLT document may be used to modify which nodes present within an XML document are children of other nodes. The XML document that the XSLT document is applied to may be referred to as a source XML document, while the document resulting from the XSLT document being applied to the source XML document may be referred to as the XML target document.

Various mapping tools currently exist for limited display to a user of how nodes of a source XML document are mapped to nodes of an XML target document. Such display may be limited by the presence of templates within the XSLT document. Within an XSLT document, multiple templates may be present. Each template may be either a match template or a named template. When applied to an XML document, a match template may be executed when a pattern associated with the template is located within the XML document. A named template may be executed when the template is called by name. The same template of an XSLT document may be applied many times to different nodes of an XML document. Accordingly, without delving into the XML code of a template, it may not conventionally be possible for a user to determine how a node from the XML source document maps to the XML target document.

As detailed here, an XSLT mapping tool is presented that may be configured to present a user at design time with an interface that indicates how nodes present in an XML source document are mapped to nodes present in an XML target document. The structure of the nodes of the XML target document may also be presented to the user. The interface may be configured to present the mappings between the nodes of the XML source document and the XML target document such that the user does not need to view specific (or any)

templates from the XSLT document. Rather, the user can view the source node and the mapped target node without delving into the specifics of how a template of the XSLT caused the mapping. If desired, by selecting a particular source node and/or target node, the user may be able to view the template code from the XSLT document to view the specifics of the mapping.

The XSLT mapping tool may be referred to as providing a "single-view" of an XSL Transformation because the mappings of each source node from the XML source document with each target node of the XML target document may be viewed by a user without the user having to access or otherwise select individual templates of the XSLT document. As such, at design time, a user may be presented with an XSLT mapping tool that quickly and efficiently allows the user to determine how source nodes are mapped to target nodes; knowledge or understanding of specific templates within the XSLT document by the user may not be necessary.

In order to provide such an XSLT mapping tool, the structure created by XSLT document when applied to the XML source document may need to be determined. To do this, a copy of the XSLT document may be created (the copy may exist only in a computer system's memory). Within the copy of the XSLT document, each match template (that is executed when a pattern present in the XML source document is located) and each name template (that is executed when the template is called by name) may be given an identifier that is unique within the copy of the XSLT document. For instance, a first template may be labeled with an identifier of "1," and the second template may also be labeled with an identifier of "2," etc. "Call" templates and "apply" templates may be identified. The modified XSLT document may be applied to the XML source document (or a copy of the XML source document). The output code created may indicate the execution order of the XSLT document as applied to the XML source document. This XML output code may indicate the call structure of the XSLT document and thus may allow the mappings between source nodes of the XML source document and target nodes of the XML target document to be determined.

While the above embodiments and following embodiments are focused on XML documents and XSLT documents, embodiments detailed herein may be applied to other programming languages. Different types of programming languages may utilize templates that are applied to documents of code, with each language having its own rules for defining templates and data types, along with rules for processing a template-based hierarchy. A template processor that is configured to apply a template to a code document may be implemented by hardware, software, firmware, or some combination thereof. For example, the various components of computer system 700 described in FIG. 7 may be used for some implementations. XML is but one example of a language that may be used to implement certain embodiments. However, it should be understood in light of this disclosure that the examples illustrating the use of XML and XSLT are merely exemplary, and not meant to be limiting. Other language using templates might be used, such as C++, C#, CSS, JAVA, PEARL, and/or the like. In some embodiments, a markup language that uses templates and that defines a set of rules for encoding documents in a format that is machine-readable (and possibly human-readable) may be used.

FIG. 1 illustrates an embodiment of a system 100 configured to present an XSLT mapping tool. Such an XSLT mapping tool may be presented to a user at design time. Systems 100 may include source code reception module 110, transform code reception module, execution order engine 140, processing engine 130, target code output module 150, and presentation/interface module 160. Some or all of the functions of each component may be performed by computer hardware, software, and/or firmware. Computer system 700 of FIG. 7 may perform the functions of some or all of the components of system 100. The functions of the various components may be combined into fewer modules or divided in a greater number of modules.

Source code reception module 110 may serve to receive source code, such as XML source code. The source code may be received from a user. For instance, a user may supply source code to source code reception module 110 from a remote computer system. The source code may be provided in the form of a file or may be provided by code being typed, copied into, or otherwise entered into a web-based graphical user interface. Source code reception module 110 may at least temporarily store the source code that has been received.

Transform code reception module 120 may serve to receive transform code, such as XLST code. The transform code may be received from a user (which may be the same user that provided the source code to source code reception module 110). For instance, a user may supply transform code to transform code reception module 120 from a remote computer system. The transform code may be provided in the form of a file or may be provided by transform code being typed, copied into, or otherwise entered into a web-based graphical user interface. Transform code reception module 120 may at least temporarily store the received source code that has been received.

Processing engine 130 may be configured to apply the transform code received by transform code reception module 120 to the source code received by source code reception module 110 to create and output target code. If system 100 is processing XML, the source code received by processing engine 130 may be XML source code and the transform code received by the processing engine may be XSLT code. Applying the transform code to the source code may involve one or more templates of the transform code being applied to the source code. The transform code may contain templates that are invoked whenever a certain pattern is present within the source code. Such templates, which may be referred to as match templates, may be invoked when a string is present within the source code. Templates may also be invoked by specifically calling the template. Templates within transform code may also call other templates. A template present in transform code may be called multiple times when applied to a source code. If the source code is XML source code and the transform code is XSLT code, the output from processing engine may be XML target code which is the result of the XSLT code being applied to the XML code.

Execution order engine 140 may analyze how transform code executes in order to determine how nodes present in target code are mapped to nodes present in source code. If the source code provided is XML, execution order engine 140 may analyze the XSLT code received from transform code reception module 120. Execution order engine 140 may make a copy of the transform code received from transform code reception module 120 and modify the copy of the transform code for use in determining the execution order of the transform code as applied to the source code. For this example, XSLT code is used as the transform code. Each match template, name template, and apply template node present within the copy of the XSLT is assigned by execution order engine 140 an identifier unique from each other assigned identifier (for example, consecutive numbers may be used). To give each of these templates an identifier, the copy of the XSLT may be modified to include a custom tag that indicates the identifier for each template.

In the modified copy of the XSLT code, non-xsl elements and conditional xsl elements present may be removed. Within each template, an XML element may be added that indicates the template begins "BeginTemplate." The element may have a child element that indicates the identifier assigned to the template. Before an "apply-templates" element, a "BeginApplyTemplate" node may be inserted. This element may have a child element that indicates an "ApplyTemplateID" which reflects an identifier assigned to the apply-templates element. The "apply-templates" element may be made a child of the "BeginApplyTemplate" element. Before each "call-template" element, a "BeginCallTemplate" element may be added. "BeginCallTemplate" may have a child element that provides an identifier: "CallTemplateID." The "call-template" element may be a child of the "BeginCallTemplate" element.

The output from execution order engine 140 may be an output file that is indicative of the structure of the transform code as applied to the source code. The output file may be generated by applying a modified copy of transform code to a (modified) copy of the source code. In some embodiments, the modified XSLT may be applied to the XML source code to generate an XML output file. The output file may contain the call structure of the transform file by indicating, according to the template identifiers, the order in which the templates present within the transform code executed. By the output file indicating the call structure of the transform code, the mapping of nodes in the source code to the nodes present in the target code (as output by processing engine 130) may be determined.

Target code output module 150 may receive target code generated by processing engine 130. In the case of XML, target code output module 150 may receive XML target code generated based on XML source code and XSLT code. The target code received by target code output module 150 may be presented and/or available to the user via presentation/interface module 160.

Presentation/interface module 160 may serve to present a user with a graphical user interface that indicates the mappings between nodes of the source code and nodes of the target code. Based on the call structure determined by execution order engine 140, presentation/interface module 160 can present to the user an interface that displays source nodes mapped to target nodes. This mapping may not involve the user needing to view and/or decipher code of individual templates. Rather, a direct mapping may be displayed to the user that shows the source node linked to the target node. The user may have the ability to view the transform code of the one or more templates that resulted in the mapping. In the instance of XML, the presentation/interface module 160 may display source nodes mapped directly with target nodes. Code from individual templates of the XSLT code may not be presented and/or may not need to be deciphered by the user to determine the mappings between source and target nodes.

Presentation/interface module 160 may be available to the user via a remote connection. For instance, presentation/interface module 160 may involve a web-based graphical user interface (GUI) being presented to the user via a web browser. As such, the user may interact with system 100 remotely across a network, such as the Internet. Additional details of presentation/interface module 160 are provided in relation to the GUI of FIG. 2.

Figure 2:
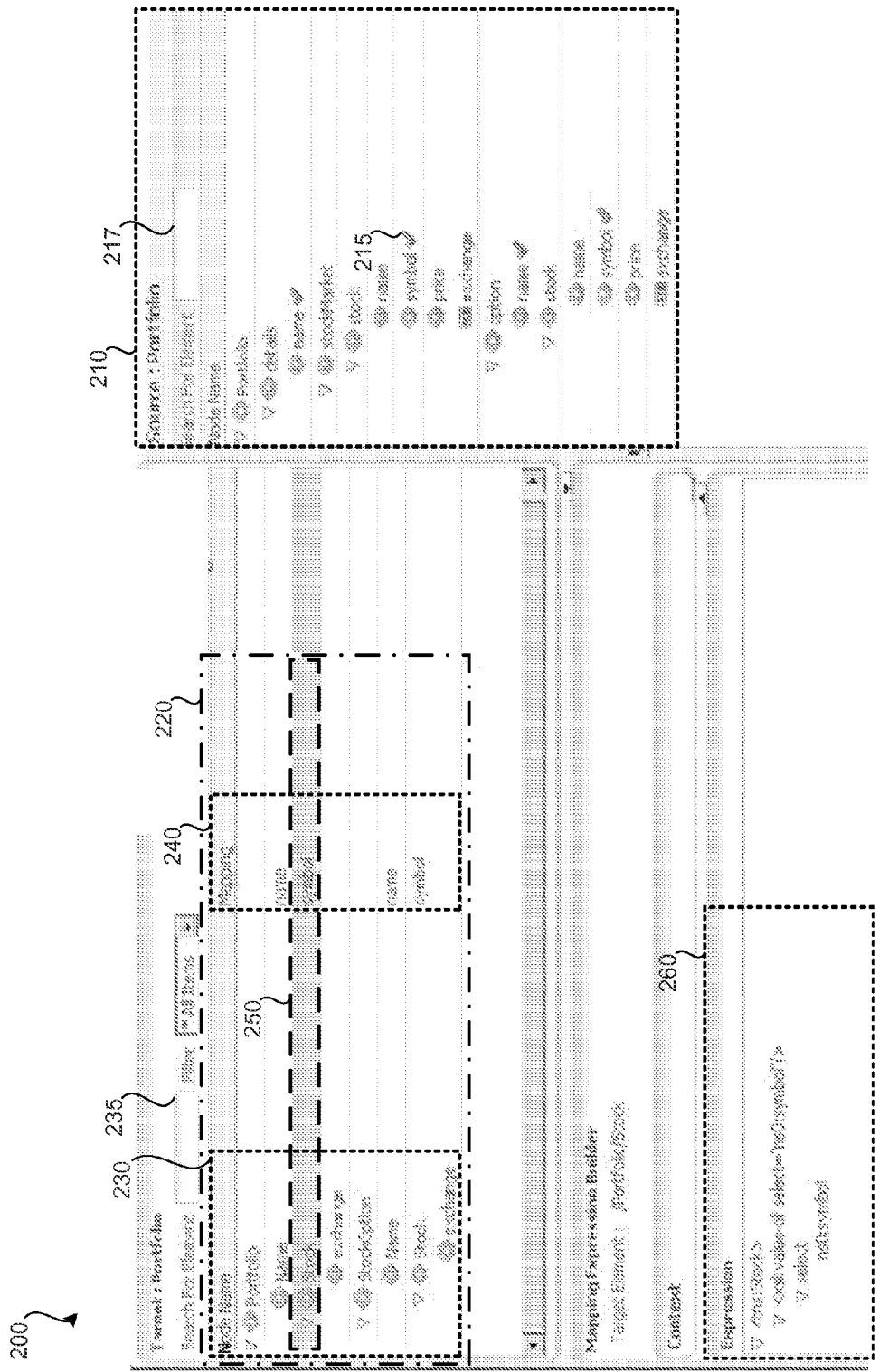
FIG. 2 illustrates an embodiment of a graphical user interface of an XSLT mapping tool.

FIG. 2 illustrates an embodiment of a graphical user interface 200 of an XSLT mapping tool. GUI 200 may be web-based. As such, a user may interact with GUI 200 across a network via a web browser. GUI 200 of FIG. 2 may correspond to the presentation/interface module 160 of system 100 of FIG. 1 or to some other system that is configured to allow for the presentation of an XSLT mapping tool.

GUI 200 may include: source node display region 210, target/source mapping display region 220, target node display region 230, mapping display region 240, and expression display region 260. Source node display region 210 may list each source node present within a piece of source code. In the case of XML, the source code may be XML source code. To create source node display region 210, the source code may be analyzed to identify each node and the structure of the nodes. Source node display region 210 displays the structure of the nodes by indicating via a hierarchal display which nodes are children of other nodes. For example, "name" and "symbol" are children nodes of "stock." Nodes may be expanded and/or collapsed to hide/show children nodes. An indication may be associated with nodes that indicate whether a source node is mapped to a target node. The indication may be a non-textual graphical element (e.g., an icon), such as checkmark 215. Checkmark 215 indicates that source node "symbol" is mapped to a target node. Source node display region 210 may permit searching for a particular or group of nodes by the user supplying a search string via search dialog 217.

GUI 200 may contain target node display region 230. Target node display region 230 may list each target node present in the target code. In some embodiments, the target code may be XML target code. To create target node display region 230, target code (which may have been created based on source code and transform code) may be analyzed to identify each node and the structure of the nodes. Target node display region 230 displays the structure of the nodes, via a hierarchal display, by indicating which nodes are children of other nodes. As can be seen, the relationship among source nodes and among target nodes may vary. For example, among the target nodes, "name" is a child node of "StockOption," while this is not true in the source nodes. Nodes may be expanded and/or collapsed to hide/show children nodes. Target node display region 230 may permit searching for a particular or group of nodes by the user supplying a search string via search dialog 235.

GUI 200 may contain target/source mapping display region 220. Target/source mapping display region 220 may indicate to which source nodes target nodes are mapped. In the case of XML, target/source mapping display region 220 may indicate the mappings between XML source nodes and XML target nodes. Regardless of the presence of one or more templates in the transform code (e.g., the XSLT code), the mappings between the nodes of the target code and the nodes of the source code may be displayed. As such, to the user, the presence of templates in the transform code that cause the mappings may be invisible or otherwise hidden. Accordingly, by looking at target/source mapping display region 220, a user may view which target nodes are mapped to which source nodes without requiring the user to view and/or decipher one or more than one templates that caused the mapping. To view the mappings between source nodes and target nodes of target/source mapping display region 220, the user may not be required to select or otherwise interact with one or more templates of the transform code.

Mapping display region 240 may indicate the name of the source node that is mapped to the corresponding target node. In the embodiment of GUI 200, a source node that is mapped to a target node appears on the same line of the table. If a source node is listed in mapping display region 240, this may correspond to the source node being indicated (e.g., via a checkmark) in source node display region 210 as mapped to a target node.

Selection 250 may indicate a user-made selection of a target node to source node mapping present in target/source mapping display region 220. Target/source mapping display region 220 displays the direct mapping between target node "Stock" and source node "symbol." In target/source mapping display region 220, no programming code related to templates of target/source mapping display region 220 is displayed nor required to be interacted with by the user. Expression display region 260 may provide an indication of the code of the transform code that results in the mapping between the source node and the target node. In the case of XML, expression display region 260 may display XSLT code of the transform code. Expression display region 260 may provide a display of transform code corresponding to one or more templates. Therefore, if a user desires to see and/or edit the transform code that resulting in the mapping of selection 250, expression display region 260 may allow such access to the user. Based on a user selection or preference, expression display region 260 may be hidden. If the user selects a different selection 250, the transform code presented in expression display region 260 may change.

It should be understood that the layout and specific information presented within GUI 200 may vary in other embodiments. For instance, the layout and components of GUI 200 may be modified to present more or less information to the user at a given time.

Figure 3:
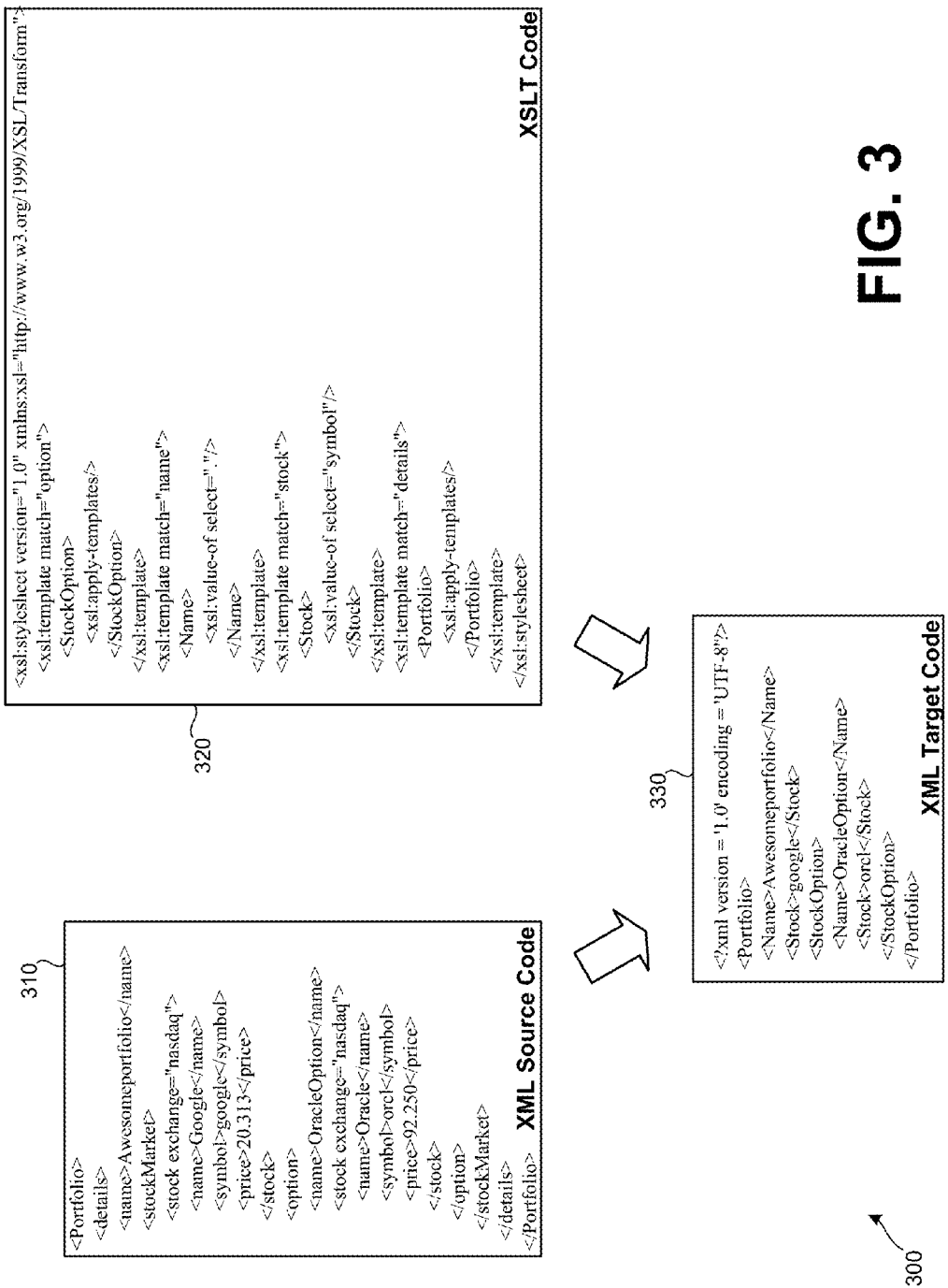
FIG. 3 illustrates an embodiment of XML target code that is generated based on XML source code and XSLT code.

FIG. 3 illustrates an embodiment 300 of XML target code that is generated based on XML source code and XSLT code. XML source code 310 may be referred to as an XML source document. Referring to system 100 of FIG. 1, XML source code may be received by source code reception module 110. XSLT code 320 may be referred to as an XSLT document. Referring to system 100 of FIG. 1, XML source code may be received by transform code reception module 120. XML source code 310 in conjunction with XSLT code 320 may be used to produced XML target code 330, which may be referred to as an XML target document. Referring to system 100, processing engine 130 may be configured to apply XSLT code 320 to XML source code 310 to produce XML target code 330. XML target code 330 may be created based on the application of templates from XSLT code 320 to the source nodes present in XML source code 310.

FIG. 4A illustrates an embodiment of XSLT code 400A that has been modified to contain template identifiers. XSLT code 400A may be used to determine the call structure of the templates of XSLT code 320 as applied to XML source code 310. This may allow for it to be determined how nodes of XML source code 310 are mapped to nodes of XML target code 330. Accordingly, by determining how nodes of XML source code 310 are mapped to nodes of XML target code 330, a GUI can be displayed that indicates the mappings between target nodes of XML target code 330 and source nodes of XML source code 310 (without the user being required to understand or even view the code of one or more templates of XSLT code 320).

XSLT code 400A may be created based on XSLT code 320 of FIG. 3. Referring to system 100, execution order engine 140 may produce XSLT code 400A. To create XSLT code 400A, a copy of XSLT code 320 may be created, such as in memory of a computer system. In XSLT code 400A, each match template node, each name template node, and each apply-template node may be assigned a custom identifier. The custom identifier may be a unique identifier within XSLT code 400A. Any predicates present in the match attribute path of a match template may be removed. Further, non-xsl elements and/or conditional statements may be removed from XSLT code 400A.

A "BeginTemplate" XML element may be inserted into each template. This "BeginTemplate" XML element may have a child element that indicates the custom identifier of the template. If a match template that is present in XSLT code 400A is directed to a root ("/") match, then a "TemplateStructure" XML element may be inserted with a "BeginTemplate" XML element being a child of the "TemplateStructure" XML element. This element may be inserted directly under match root (match="/"). This may ensure that the result document has a root element and is well formed. Without this element, the result document may not be a valid xml document that can be parsed. The "Template Structure" XML element becomes the root element because it is the first element we insert in the "match="/"", and the match root is executed first.

Within a template of XSLT code 400A, before an "apply-templates" statement, an XML element, "BeginApplyTemplate" may be added. "BeginApplyTemplate" may have a child element of "ApplyTemplateID" that indicates the corresponding custom identifier. The "apply-templates" statement may become a child of the "BeginApplyTemplate" element. If a predicate is present in the select statement of an "apply-template" statement, the predicate may be removed. The predicate in the select statement may denote additional conditions that are applied on the value of the applicable source element. A predicate may be denoted in "[ ]" brackets. For example, in this select statement: "select="/Portfolio/details/[name='Awesomeportfolio']", the predicate is [name='Awesomeportofolio']. The predicate denotes that the template is applied only if the name of the portfolio is 'Awesomeportfolio'. In the single view representation of the XSL in the GUI, a predicate may be irrelevant since we want to show the template being applied to the "name" source element irrespective of its value being 'Awesomeportfolio' or something else. Hence we may remove predicates.

Before each "call-template" element, an XML element "BeginCallTemplate" may be inserted. "BeginCallTemplate" may have a child element of "CallTemplateID" that indicates the custom identifier of the template. The "call-template" statement may become a child of the "BeginCallTemplate" element. In instances where no match template is defined on the root, an XSL element to match on the root will be created. For this, a call to "<xsl:apply-templates>" will be inserted for this match. This may allow for control of the execution of the XSLT to be taken over from the start so that the execution order can be determined (which, in turn, allows the mapping between source nodes and target nodes to be identified). An XML element "TemplateStructure" may be created within this match. Following these steps or similar steps, XSLT code 400A may be created.

By reviewing XSLT code 400, it may be seen how a different identifier was assigned to each template, as presented in Table 1.

TABLE 1

| Identifier | Template |
| --- | --- |
| 1 | "option" |
| 1_1 | apply-templates |
| 2 | "name" |
| 3 | "stock" |
| 4 | "details" |

TABLE 1-continued

| Identifier | Template |
| --- | --- |
| 4_1 | apply-templates |
| 5 | /(root) |
| 5_1 | apply-templates |

An internal document object model (DOM) may be created that mirrors the nodes of the source XML. The DOM may not be a full representation of the XML source code because the source nodes may not repeat and optional nodes may be present. An internal copy (the internal DOM) of the XML source document is created from XML Schema that is passed in by a user. The schema document contains instructions on how the XML document is to be structured. This schema document may contain instruction that certain element(s) can be repeated. For example, under 'stockMarket' element the 'stock' element can be repeated. Meaning the portfolio consisting of stockMarket may contain multiple 'stock' elements. However, when the XML Source is created, the stock element may not be repeated. To arrive at the template call structure it is not necessary to have the repeated elements in the source. Regarding 'optional' elements, certain elements may be specified as optional in the schema, however when constructed, the XML source ignore this designates and treats optional element as existing. XSLT code 400A may be executed on the internal DOM tree of the XML source code. When XSLT code 400A is executed on the XML source code (in this embodiment, source XML code 310 of FIG. 3), XML target code may be created. This target code may be parsed to determine the execution order of the XSLT as applied to the XML source code, allowing a determination of which "apply-templates" statements caused templates to be invoked.

FIG. 4B illustrates an embodiment of XML output code 400B generated based on XSLT code 400A as applied to XML source code 310. XML output code 400B may be created by execution order engine 140. From XML output code 400B the execution order of XSLT code 400A as applied to XML source code 310 can be determined. By parsing XML output code 400B, the order of templates invoked can be determined. Based on the order of the templates invoked and by knowing which template each identifier corresponds to, it may be possible to determine which source node of the XML source code corresponds to which target node of XML target code.

When the template identifiers are matched with the name of the template from table 1, the call structure of the XSLT, as applied to the XML source code may be determined. Table 2 presents the call structure of XML output code 400B.

TABLE 2

| Execution Order | Structure |
| --- | --- |
| 5 | /(root) |
| 5_1 | |
| 4 | details |
| 4_1 | |
| 2 | name |
| 3 | stock |
| 1 | option |
| 1_1 | |
| 2 | name |
| 3 | stock |

The mappings of Table 2 are determined by walking through the original XSL document that is received. If the XSL document contains a match root, the mappings may start from there. If no match root is present, the call structure document may be examined to determine what is the first template that is performed. Within each template, when an 'apply-template' or 'call-template' statement is encountered, the call structure document is consulted to determine which templates we should step into next. As the templates are analyzed, for every target element encountered, the absolute path is continued to be built. This absolute path may then be compared to the absolute path of the target schema document to identify that a target element is mapped. Similarly, to identify the source the target is mapped to, the absolute path of the source element may be internally constructed. This absolute path may be matched to the absolute path of the source schema to identify which source element is mapped.

It should be understood that the code presented as part of FIGS. 3, 4A, and 4B is exemplary only. Source code, transform code, output code, and target code may be in a language other than XML/XLST. Further, when implemented, the source code, transform code, output code, and/or target code may be significantly more complex.

Figure 5:
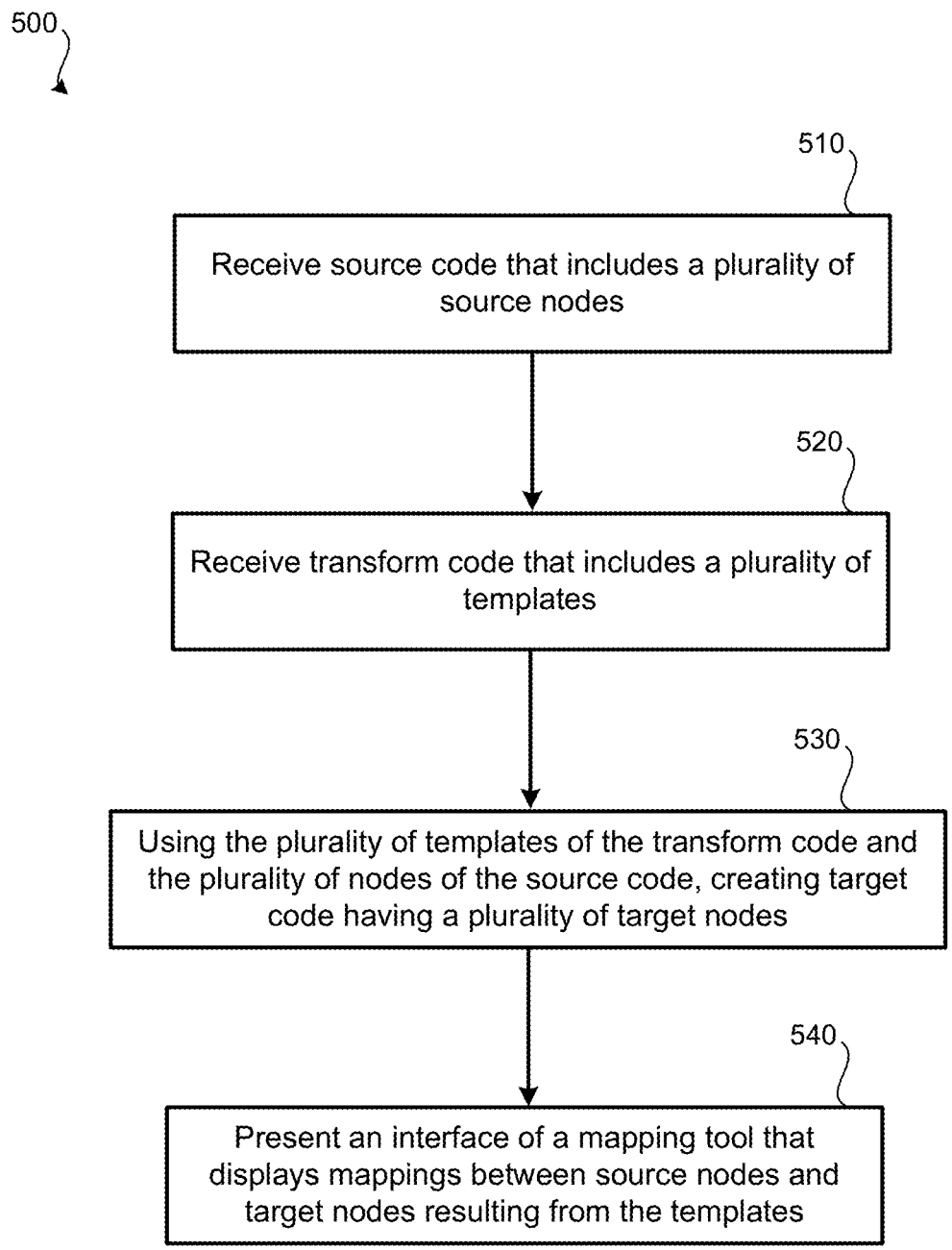
FIG. 5 illustrates an embodiment of a method for presenting an XSLT mapping tool.

Various methods may be performed using the system of FIG. 1 and/or the GUI of FIG. 2. FIG. 5 illustrates an embodiment of a method 500 for presenting a mapping tool (e.g., an XSLT mapping tool) to a user at design time. Each step of method 500 may be performed using system 100 of FIG. 1 or some other system configured to present an XSLT mapping tool. Each step of method 500 may be performed by a computer system. For example, computer system 700 of FIG. 7 may be used to perform each step of method 500. Accordingly, means for performing method 500 include one or more computer systems, networks, and/or a remote computer system.

At step 510, source code may be received. The source code may include a plurality of nodes. The source code may be XML code, which may be referred to as an XML document. In some embodiments, the source code may be in some other programming language. The XML code may be received via a web-based graphical user interface. As such, the XML code may be received from a user from a remote computer system (e.g., across a network) for processing. In some embodiments, the source code is from a user in the form of a file uploaded or otherwise provided to the system performing method 500.

At step 520, transform code may be received. The transform code may include a plurality of templates that are intended to be applied to the source code. Such templates may affect or determine the mappings of source nodes of the source code to target nodes of target code created using the transform code and the source code. The transform code may be XSLT code, which may be referred to as an XSLT document. The XSLT code may be received via the same web-based graphical user interface as the source code received at step 510. As such, the XML code may be received from a user from a remote computer system (e.g., across a network) for processing. In some embodiments, the transform code is received in the form of a file uploaded or otherwise provided to the system performing method 500. In some embodiments, the transform code may be in some other programming language than XSLT.

At step 530, using the plurality of templates of the transform code and the plurality of nodes of the source code, target code may be created that has a plurality of target nodes. The target code may be XML code, which may be referred to as an XML document. In some embodiments, the target code may be in some programming language other than XML. The target code, as created, may be presented to the user via a web-based graphical user interface. As such, the target code may be sent to a user at a remote computer system (e.g., across a network) for viewing. In some embodiments, the target code is provided to the user in the form of a file for download or otherwise made available to the user by the system performing method 500.

At step 540, a mapping tool (such as an XSLT mapping tool) may be presented to the user that indicates the mappings between the source nodes of the source code and the target nodes of the target code created at step 530. The mappings between the source nodes and the target nodes may be defined, at least in part, by the plurality of templates present in the transform code received at step 520. When the XSLT mapping tool presents the mappings between one or more of the source nodes of the source code and one or more target nodes of the target code, the code of one or more templates of the transform code may not be displayed and/or may not need to be interpreted by the user. Rather, a name of the target node may be displayed as associated with the name of the source node. For instance, referring to the exemplary embodiment of FIG. 2, target node "stock" is shown as mapped to source node "symbol" within target/source mapping display region 220.

Figure 6:
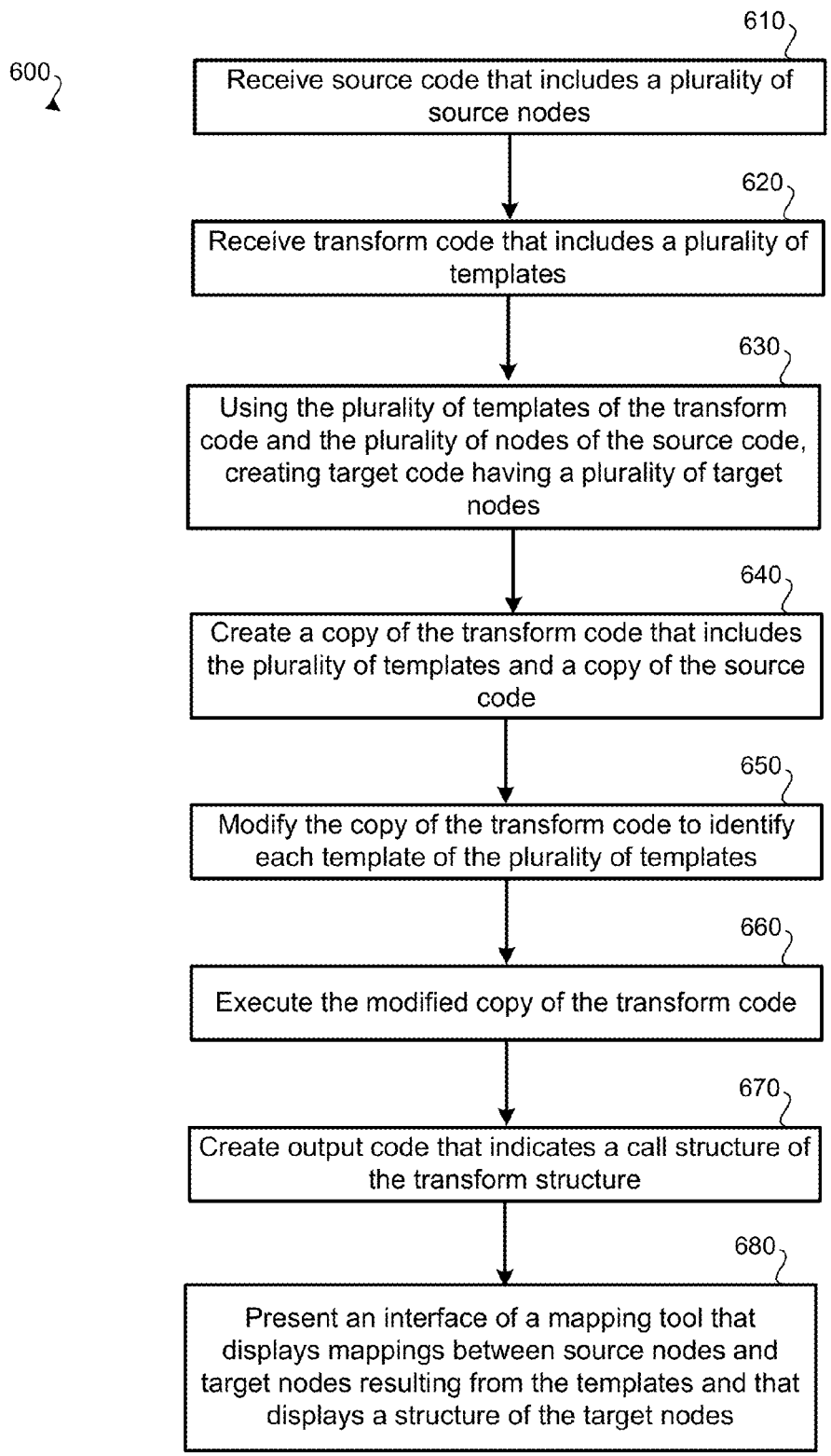
FIG. 6 illustrates another embodiment of a method for presenting an XSLT mapping tool.

FIG. 6 illustrates another embodiment of a method 600 for presenting an XSLT mapping tool to a user. Each step of method 600 may be performed using system 100 of FIG. 1 or some other system configured to present an XSLT mapping tool. Each step of method 600 may be performed by a computer system. For example, computer system 700 of FIG. 7 may be used to perform each step of method 600. Accordingly, means for performing method 600 include one or more computer systems, networks, and/or a remote computer system. Method 600 may be a more detailed embodiment of method 500.

At step 610, source code may be received. The source code may include a plurality of nodes. The source code may be XML code, which may be referred to as an XML document. In some embodiments, the source code may be in some other programming language. The XML code may be received via a web-based graphical user interface. As such, the XML code may be received from a user from a remote computer system (e.g., across a network) for processing. In some embodiments, the source code is from a user in the form of a file uploaded or otherwise provided to the system performing method 600.

At step 620, transform code may be received. The transform code may include a plurality of templates that are intended to be applied to the source code. Such templates may affect or determine the mappings of source nodes of the source code to target nodes of target code created using the transform code and the source code. The transform code may be XSLT code, which may be referred to as an XSLT document. The XSLT code may be received via the same web-based graphical user interface as the source code received at step 610. As such, the XML code may be received from a user from a remote computer system (e.g., across a network) for processing. In some embodiments, the transform code is received in the form of a file uploaded or otherwise provided to the system performing method 600. In some embodiments, the transform code may be in some other programming language than XSLT.

At step 630, using the plurality of templates of the transform code and the plurality of nodes of the source code, target code may be created that has a plurality of target nodes. The target code may be XML code, which may be referred to as an XML document. In some embodiments, the target code may be in some other programming language than XML. The target code, as created, may be presented to the user via a web-based graphical user interface. As such, the target code may be sent to a user at a remote computer system (e.g., across a network) for viewing. In some embodiments, the target code is provided to the user in the form of a file for download or otherwise made available to the user by the system performing method 600.

At step 640, a copy of the transform code may be created from the transform code. The copy of the transform code, which may be XSLT code, may be stored in memory of the system performing method 600. The copy of the transform code may be modified and may be used to determine the call structure of the transform code as applied to the source code received at step 610. In some embodiments, a copy of the source code, which may be XML source code, is also created.

At step 650, the copy of the transform code may be modified to include identifiers for each template. As such, when the templates are executed, based on the identifier, it can be determined which template executed. More specifically, for each match template node, each name template node, and each apply-template node may be assigned a custom identifier. The custom identifier may be a unique identifier within transform (XSLT) code. Any predicates present in the match attribute path of a match template may be removed. Further, non-xsl elements and/or conditional statements may be removed from the XSLT code at step 650.

Further, at step 650, a "BeginTemplate" XML element may be inserted into each template. This "BeginTemplate" XML element may have a child element that indicates the custom identifier of the template. If a match template that is present in the transform code is directed to a root ("/") match, then a "TemplateStructure" XML element may be inserted with a "BeginTemplate" XML element being a child of the "TemplateStructure" XML element. Within a template of the transform code, before an "apply-templates" statement, an XML element, "BeginApplyTemplate" may be added. "BeginApplyTemplate" may have a child element of "ApplyTemplateID" that indicates the corresponding custom identifier. The "apply-templates" statement may become a child of the "BeginApplyTemplate" element. If a predicate is present in the select statement of an "apply-template" statement, the predicate may be removed.

Further, at step 650, before each "call-template" element, an XML element "BeginCallTemplate" may be inserted. "BeginCallTemplate" may have a child element of "CallTemplateID" that indicates the custom identifier of the template. The "call-template" statement may become a child of the "BeginCallTemplate" element. In instances where no match template is defined on the root, an XSL element to match on the root will be created. For this, a call to "<xsl:apply-templates>" will be inserted for this match. This may allow for control of the execution of the XSLT to be taken over from the start so that the execution order can be determined (which, in turn, allows the mapping between source nodes and target nodes to be identified). An XML element "TemplateStructure" may be created within this match. It should be understood that the naming conventions used for the created tags may be modified while maintaining the functionality.

At step 660, the modified copy of the transform code may be applied to the source code received at step 610 (or a copy of the source code created at step 640). This may result in an output file, such as an XML output file being generated at step 670. Based on the execution order identified within the output file (as indicated by the custom identifiers), the mappings between the source nodes of the source code (received at step 610) and the target nodes of the target code (created at step 630) may be identified. Accordingly, by using the execution order identified in the output code of step 660, the mappings among source nodes and target nodes may be identified.

At step 680, a mapping tool (such as an XSLT mapping tool) may be presented to the user that indicates the mappings between the source nodes of the source code and the target nodes of the target code created at step 630. The mappings between the source nodes and the target nodes may be defined, at least in part, by the plurality of templates present in the transform code received at step 620. The mappings may be determined by examining the execution order of templates of the transform code as indicated in the output code created at step 670. When the mapping tool presents the mappings between one or more of the source nodes of the source code and one or more target nodes of the target code, the code of one or more templates of the transform code may not be displayed and/or may not need to be interpreted by the user. Rather, a name of the target node may be displayed as associated with the name of the source node. For instance, referring to the exemplary embodiment of FIG. 2, target node "stock" is shown as mapped to source node "symbol" within target/source mapping display region 220 (without requiring the user to access, understand, or otherwise interpret one or more templates of the transform code.

Figure 7:
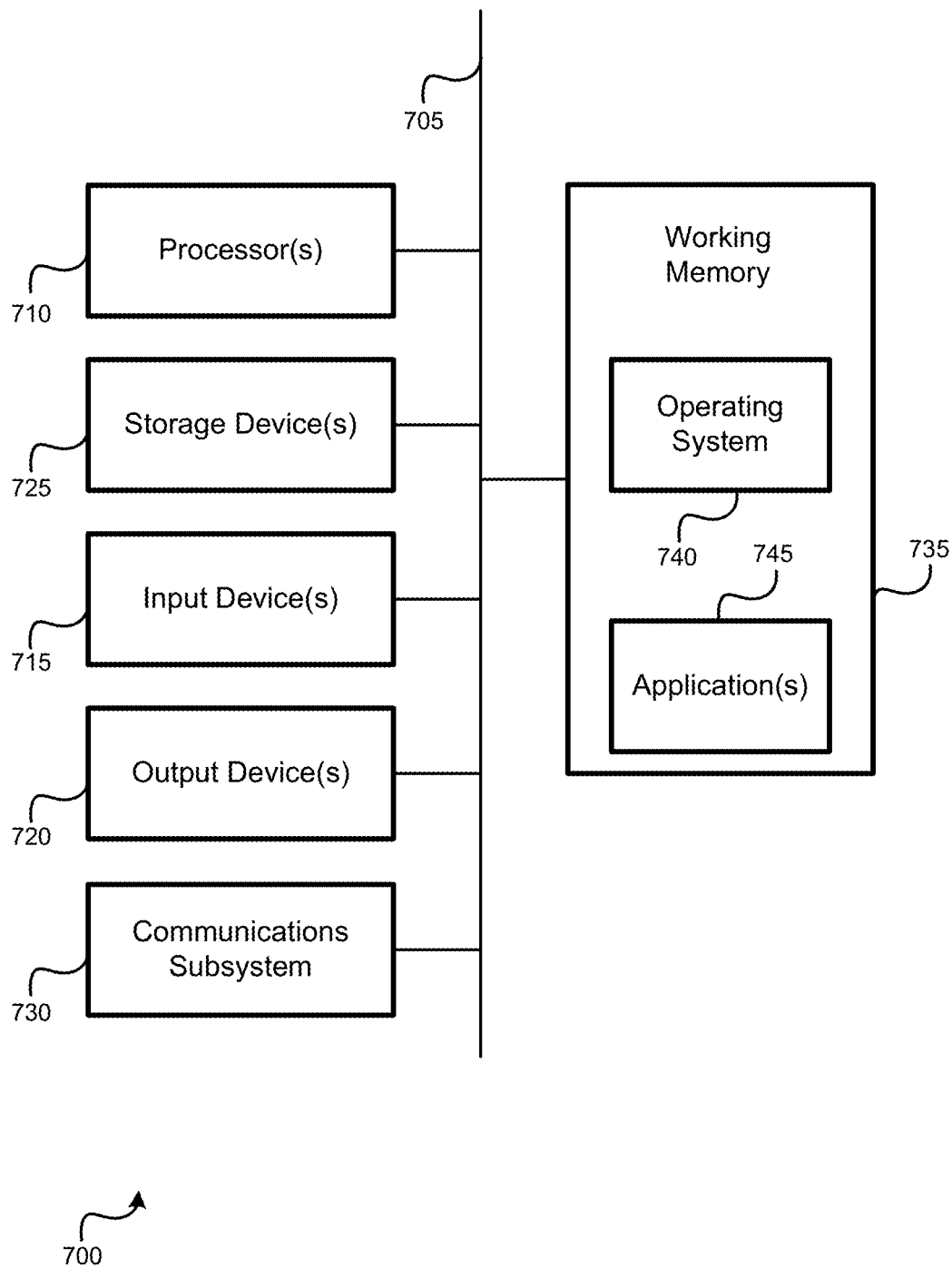
FIG. 7 illustrates an embodiment of a computer system.

FIG. 7 illustrates an embodiment of a computer system. A computer system as illustrated in FIG. 7 may be incorporated as part of the previously described computerized systems, such as system 100 of FIG. 1. Computer system 700 can represent the computer systems and/or the remote computer systems discussed in this application. FIG. 7 provides a schematic illustration of one embodiment of a computer system 700 that can perform the methods provided by various embodiments, as described herein. It should be noted that FIG. 7 is meant only to provide a generalized illustration of various components, any or all of which may be utilized as appropriate. FIG. 7, therefore, broadly illustrates how individual system elements may be implemented in a relatively separated or relatively more integrated manner.

The computer system 700 is shown comprising hardware elements that can be electrically coupled via a bus 705 (or may otherwise be in communication, as appropriate). The hardware elements may include one or more processors 710, including without limitation one or more general-purpose processors and/or one or more special-purpose processors (such as digital signal processing chips, graphics acceleration processors, and/or the like); one or more input devices 715, which can include without limitation a mouse, a keyboard, and/or the like; and one or more output devices 720, which can include without limitation a display device, a printer, and/or the like.

The computer system 700 may further include (and/or be in communication with) one or more non-transitory storage devices 725, which can comprise, without limitation, local and/or network accessible storage, and/or can include, without limitation, a disk drive, a drive array, an optical storage device, a solid-state storage device, such as a random access memory ("RAM"), and/or a read-only memory ("ROM"), which can be programmable, flash-updateable and/or the like. Such storage devices may be configured to implement any appropriate data stores, including without limitation, various file systems, database structures, and/or the like.

The computer system 700 might also include a communications subsystem 730, which can include without limitation a modem, a network card (wireless or wired), an infrared communication device, a wireless communication device, and/or a chipset (such as a Bluetooth™ device, an 802.11 device, a WiFi device, a WiMax device, cellular communication facilities, etc.), and/or the like. The communications subsystem 730 may permit data to be exchanged with a network (such as the network described below, to name one example), other computer systems, and/or any other devices described herein. In many embodiments, the computer system 700 will further comprise a working memory 735, which can include a RAM or ROM device, as described above.

The computer system 700 also can comprise software elements, shown as being currently located within the working memory 735, including an operating system 740, device drivers, executable libraries, and/or other code, such as one or more application programs 745, which may comprise computer programs provided by various embodiments, and/or may be designed to implement methods, and/or configure systems, provided by other embodiments, as described herein. Merely by way of example, one or more procedures described with respect to the method(s) discussed above might be implemented as code and/or instructions executable by a computer (and/or a processor within a computer); in an aspect, then, such code and/or instructions can be used to configure and/or adapt a general purpose computer (or other device) to perform one or more operations in accordance with the described methods.

A set of these instructions and/or code might be stored on a non-transitory computer-readable storage medium, such as the non-transitory storage device(s) 725 described above. In some cases, the storage medium might be incorporated within a computer system, such as computer system 700. In other embodiments, the storage medium might be separate from a computer system (e.g., a removable medium, such as a compact disc), and/or provided in an installation package, such that the storage medium can be used to program, configure, and/or adapt a general purpose computer with the instructions/code stored thereon. These instructions might take the form of executable code, which is executable by the computer system 700 and/or might take the form of source and/or installable code, which, upon compilation and/or installation on the computer system 700 (e.g., using any of a variety of generally available compilers, installation programs, compression/decompression utilities, etc.), then takes the form of executable code.

It will be apparent to those skilled in the art that substantial variations may be made in accordance with specific requirements. For example, customized hardware might also be used, and/or particular elements might be implemented in hardware, software (including portable software, such as applets, etc.), or both. Further, connection to other computing devices such as network input/output devices may be employed.

As mentioned above, in one aspect, some embodiments may employ a computer system (such as the computer system 700) to perform methods in accordance with various embodiments of the invention. According to a set of embodiments, some or all of the procedures of such methods are performed by the computer system 700 in response to processor 710 executing one or more sequences of one or more instructions (which might be incorporated into the operating system 740 and/or other code, such as an application program 745) contained in the working memory 735. Such instructions may be read into the working memory 735 from another computer-readable medium, such as one or more of the non-transitory storage device(s) 725. Merely by way of example, execution of the sequences of instructions contained in the working memory 735 might cause the processor(s) 710 to perform one or more procedures of the methods described herein.

The terms "machine-readable medium" and "computer-readable medium," as used herein, refer to any medium that participates in providing data that causes a machine to operate in a specific fashion. In an embodiment implemented using the computer system 700, various computer-readable media might be involved in providing instructions/code to processor(s) 710 for execution and/or might be used to store and/or carry such instructions/code. In many implementations, a computer-readable medium is a physical and/or tangible storage medium. Such a medium may take the form of a non-volatile media or volatile media. Non-volatile media include, for example, optical and/or magnetic disks, such as the non-transitory storage device(s) 725. Volatile media include, without limitation, dynamic memory, such as the working memory 735.

Common forms of physical and/or tangible computer-readable media include, for example, a floppy disk, a flexible disk, hard disk, magnetic tape, or any other magnetic medium, a CD-ROM, any other optical medium, punchcards, papertape, any other physical medium with patterns of holes, a RAM, a PROM, EPROM, a FLASH-EPROM, any other memory chip or cartridge, or any other medium from which a computer can read instructions and/or code.

Various forms of computer-readable media may be involved in carrying one or more sequences of one or more instructions to the processor(s) 710 for execution. Merely by way of example, the instructions may initially be carried on a magnetic disk and/or optical disc of a remote computer. A remote computer might load the instructions into its dynamic memory and send the instructions as signals over a transmission medium to be received and/or executed by the computer system 700.

The communications subsystem 730 (and/or components thereof) generally will receive signals, and the bus 705 then might carry the signals (and/or the data, instructions, etc. carried by the signals) to the working memory 735, from which the processor(s) 710 retrieves and executes the instructions. The instructions received by the working memory 735 may optionally be stored on a non-transitory storage device 725 either before or after execution by the processor(s) 710.

It should further be understood that the components of computer system @00 can be distributed across a network. For example, some processing may be performed in one location using a first processor while other processing may be performed by another processor remote from the first processor. Other components of computer system @00 may be similarly distributed.

The methods, systems, and devices discussed above are examples. Various configurations may omit, substitute, or add various procedures or components as appropriate. For instance, in alternative configurations, the methods may be performed in an order different from that described, and/or various stages may be added, omitted, and/or combined. Also, features described with respect to certain configurations may be combined in various other configurations. Different aspects and elements of the configurations may be combined in a similar manner. Also, technology evolves and, thus, many of the elements are examples and do not limit the scope of the disclosure or claims.

Specific details are given in the description to provide a thorough understanding of example configurations (including implementations). However, configurations may be practiced without these specific details. For example, well-known circuits, processes, algorithms, structures, and techniques have been shown without unnecessary detail in order to avoid obscuring the configurations. This description provides example configurations only, and does not limit the scope, applicability, or configurations of the claims. Rather, the preceding description of the configurations will provide those skilled in the art with an enabling description for implementing described techniques. Various changes may be made in the function and arrangement of elements without departing from the spirit or scope of the disclosure.

Also, configurations may be described as a process which is depicted as a flow diagram or block diagram. Although each may describe the operations as a sequential process, many of the operations can be performed in parallel or concurrently. In addition, the order of the operations may be rearranged. A process may have additional steps not included in the figure. Furthermore, examples of the methods may be implemented by hardware, software, firmware, middleware, microcode, hardware description languages, or any combination thereof. When implemented in software, firmware, middleware, or microcode, the program code or code segments to perform the necessary tasks may be stored in a non-transitory computer-readable medium such as a storage medium. Processors may perform the described tasks.

Having described several example configurations, various modifications, alternative constructions, and equivalents may be used without departing from the spirit of the disclosure. For example, the above elements may be components of a larger system, wherein other rules may take precedence over or otherwise modify the application of the invention. Also, a number of steps may be undertaken before, during, or after the above elements are considered. Accordingly, the above description does not bound the scope of the claims.

What is claimed is:

1. A method for providing an XSLT mapping tool, the method comprising:
   receiving, by a computer system, XML source code that includes a plurality of source nodes;
   receiving, by the computer system, XSLT code configured to transform the XML source code into XML target code, wherein
   the XSLT code includes multiple XSLT templates;
   using, by the computer system, the multiple XSLT templates of the XSLT code and the XML source code to create the XML target code, wherein
   the XML target code includes a plurality of target nodes;
   modifying, by the computer system, the XSLT code to include a unique identifier assigned to each of the multiple XSLT templates;
   using, by the computer system, the modified XSLT code and the XML source code to create XML output code, the XML output code including the unique identifiers;
   using, by the computer system, the XML output code to determine mappings between the plurality of source nodes of the XML source code and the plurality of target nodes of the XML target code resulting from the multiple XSLT templates; and
   presenting, by the computer system, an interface of the XSLT mapping tool that displays the mappings between the plurality of source nodes of the XML source code and the plurality of target nodes of the XML target code resulting from the multiple XSLT templates.

2. The method for providing the XSLT mapping tool of claim 1, wherein presenting the interface of the XSLT mapping tool that directly displays the mappings between the plurality of source nodes of the XML source code and the plurality of target nodes of the XML target code comprises:
   hiding code of the multiple XSLT templates.

3. The method for providing the XSLT mapping tool of claim 1, further comprising:
   receiving, by the computer system, a selection of a target node from the plurality of target nodes from a user;

presenting, by the computer system, a graphical indication of a source node of the plurality of source nodes mapped to the target node; and presenting, by the computer system, at the same time as the graphical indication of the source node, code of an XSLT template of the multiple XSLT templates that maps the source node to the target node.

4. The method for providing the XSLT mapping tool of claim 1, further comprising:

concurrently with presenting the interface of the XSLT mapping tool that directly displays the mappings between the plurality of source nodes of the XML source code and the plurality of target nodes of the XML target code, displaying:

a source structure of the plurality of source nodes of the XML source code; and a target structure of the plurality of target nodes of the XML target code.

5. The method for providing the XSLT mapping tool of claim 1, wherein the XML output code indicates a call structure of the XSLT code.

6. The method for providing the XSLT mapping tool of claim 5, further comprising:

determining, by the computer system, a structure of the XML target code using the call structure of the XSLT code.

7. The method for providing the XSLT mapping tool of claim 6, wherein presenting the interface of the XSLT mapping tool that directly displays the mappings between the plurality of source nodes of the XML source code and the plurality of target nodes of the XML target code comprises presenting the determined structure of the XML target code.

8. The method for providing the XSLT mapping tool of claim 1, wherein the interface of the XSLT mapping tool is presented using a web-based graphical user interface and the computer system is remote from a user submitting the XSLT code and the XML source code.

9. A computer program product residing on a non-transitory processor-readable medium for providing an XSLT mapping tool, the computer program product comprising processor-readable instructions configured to cause a processor to:

receive XML source code that includes a plurality of source nodes;

receive XSLT code configured to transform the XML source code into XML target code, wherein the XSLT code includes multiple XSLT templates;

use the multiple XSLT templates of the XSLT code and the XML source code to create the XML target code, wherein the XML target code includes a plurality of target nodes;

modify the XSLT code to include a unique identifier assigned to each of the multiple XSLT templates;

use the modified XSLT code and the XML source code to create XML output code, the XML output code including the unique identifiers;

use the XML output code to determine mappings between the plurality of source nodes of the XML source code and the plurality of target nodes of the XML target code resulting from the multiple XSLT templates; and cause an interface of the XSLT mapping tool to be presented that displays mappings between the plurality of source nodes of the XML source code and the plurality of target nodes of the XML target code resulting from the multiple XSLT templates.

10. The computer program product residing for providing an XSLT mapping tool of claim 9, wherein the processor-readable instructions that cause the interface of the XSLT mapping tool to be presented that directly displays the mappings between the plurality of source nodes of the XML source code and the plurality of target nodes of the XML target code further comprises:

processor-readable instructions configured to cause code of the multiple XSLT templates to not be presented.

11. The computer program product residing for providing an XSLT mapping tool of claim 9, wherein the processor-readable instructions further comprise processor-readable instructions configured to cause the processor to:

receive a selection of a target node from the plurality of target nodes from a user;

cause a graphical indication of a source node of the plurality of source nodes mapped to the target node to be presented; and cause, at the same time as the graphical indication of the source node, code of an XSLT template of the multiple XSLT templates that maps the source node to the target node to be presented.

12. The computer program product residing for providing an XSLT mapping tool of claim 9, wherein the processor-readable instructions further comprise processor-readable instructions configured to cause the processor to:

concurrently with causing the interface of the XSLT mapping tool that directly displays the mappings between the plurality of source nodes of the XML source code and the plurality of target nodes of the XML target code to be presented, cause:

a source structure of the plurality of source nodes of the XML source code to be presented; and a target structure of the plurality of target nodes of the XML target code to be presented.

13. The computer program product residing for providing an XSLT mapping tool of claim 9, wherein the XML output code indicates a call structure of the XSLT code.

14. The computer program product residing for providing an XSLT mapping tool of claim 13, wherein the processor-readable instructions further comprise processor-readable instructions configured to cause the processor to:

determine a structure of the XML target code using the call structure of the XSLT code.

15. The computer program product residing for providing an XSLT mapping tool of claim 14, wherein the processor-readable instructions for causing the interface of the XSLT mapping tool that directly displays the mappings between the plurality of source nodes of the XML source code and the plurality of target nodes of the XML target code to be presented further comprises processor-readable instructions configured to cause the determined structure of the XML target code to be presented.

16. The computer program product residing for providing an XSLT mapping tool of claim 9, wherein the interface of the XSLT mapping tool is presented using a web-based graphical user interface and the processor is remote from a user submitting the XSLT code and the XML source code.

17. A system for providing an XSLT mapping tool, the system comprising:

a processor; and a memory communicatively coupled with and readable by the processor and having stored therein processor-readable instructions which, when executed by the processor, cause the processor to:

receive XML source code that includes a plurality of source nodes;

receive XSLT code configured to transform the XML source code into XML target code, wherein the XSLT code includes multiple XSLT templates;

use the multiple XSLT templates of the XSLT code and the XML source code to create the XML target code, wherein the XML target code includes a plurality of target nodes;

modify the XSLT code to include a unique identifier assigned to each of the multiple XSLT templates;

use the modified XSLT code and the XML source code to create XML output code, the XML output code including the unique identifiers;

use the XML output code to determine mappings between the plurality of source nodes of the XML source code and the plurality of target nodes of the XML target code resulting from the multiple XSLT templates; and cause an interface of the XSLT mapping tool to be presented that displays mappings between the plurality of source nodes of the XML source code and the plurality of target nodes of the XML target code resulting from the multiple XSLT templates.

18. The system for providing an XSLT mapping tool of claim 17, wherein the processor-readable instructions are further configured to cause code of the multiple XSLT templates to not be displayed.

* * * * *